United States Patent
Loera et al.

(10) Patent No.: US 10,046,709 B2
(45) Date of Patent: *Aug. 14, 2018

(54) UNDER-SEAT VEHICLE COMPARTMENT HAVING A CLAMP ASSEMBLY FOR ENGAGING A TUBE SUPPORT AND FOR ABSORBING TOLERANCES AND MOVEMENT RELATED NOISE

(71) Applicant: Ford Global Technologies, LLC, Dearborn, MI (US)

(72) Inventors: José Alfredo Peregrina Loera, México City (MX); Omar Antonio Ramirez Pavón, Portales Norte (MX); Francisco Ronquillo Meléndez, Puebla (MX); Mario Garcia Lannoy, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,326

(22) Filed: Sep. 11, 2017

(65) Prior Publication Data

US 2018/0022283 A1   Jan. 25, 2018

Related U.S. Application Data

(63) Continuation of application No. 14/993,365, filed on Jan. 12, 2016, now Pat. No. 9,802,546.

(51) Int. Cl.
*B60R 7/04* (2006.01)
*B60N 2/90* (2018.01)

(52) U.S. Cl.
CPC ............... *B60R 7/043* (2013.01); *B60N 2/90* (2018.02)

(58) Field of Classification Search
CPC ........................................ B60R 7/043
USPC ........................................ 296/37.15
See application file for complete search history.

(56) References Cited

U.S. PATENT DOCUMENTS

| | | |
|---|---|---|
| 2,968,341 A | 1/1961 | Welles |
| 3,026,141 A | 3/1962 | Welles |
| 5,039,155 A | 8/1991 | Suman et al. |
| 5,096,249 A | 3/1992 | Hines |
| 6,106,044 A | 8/2000 | Schlachter |
| 6,161,896 A | 12/2000 | Johnson et al. |
| 7,195,143 B2 | 3/2007 | Reeson |
| 7,318,616 B1 | 1/2008 | Bradley |
| 7,611,183 B2 | 11/2009 | Burkey et al. |

(Continued)

*Primary Examiner* — Jason S Morrow
(74) *Attorney, Agent, or Firm* — Vichit Chea; Price Heneveld LLP

(57) ABSTRACT

A storage container for a vehicular seat includes a cushion pan for supporting a cushion. A lateral support bar extends between opposing side members and is positioned below the cushion pan. A container housing is disposed between the opposing side members and is fixedly attached to an underside of the cushion pan. A rear clamp of the container housing defines a containment region within which the lateral support bar is disposed. The rear clamp defines a surface engagement with the lateral support bar and is slidably engaged with the lateral support bar. Generally vertical displacement of the container housing relative to the lateral support bar biases the lateral support bar against the rear clamp to define an absorbing state of the rear clamp that receives at least a portion of the generally vertical displacement of the container housing relative to the lateral support bar.

20 Claims, 9 Drawing Sheets

(56) References Cited

U.S. PATENT DOCUMENTS

| | | | |
|---|---|---|---|
| 2004/0155494 A1* | 8/2004 | Mizuno | B60N 2/305 297/188.09 |
| 2010/0231011 A1 | 9/2010 | Lindsay | |
| 2013/0230349 A1 | 9/2013 | Dontfraid | |
| 2013/0338642 A1 | 12/2013 | Maulin | |
| 2014/0151514 A1 | 6/2014 | Asai | |
| 2014/0225403 A1 | 8/2014 | Shimada et al. | |
| 2015/0084386 A1* | 3/2015 | Hellman | A47C 4/54 297/188.08 |

\* cited by examiner

UNDER-SEAT VEHICLE COMPARTMENT HAVING A CLAMP ASSEMBLY FOR ENGAGING A TUBE SUPPORT AND FOR ABSORBING TOLERANCES AND MOVEMENT RELATED NOISE

CROSS-REFERENCE TO RELATED APPLICATION

The present application is a continuation of U.S. patent application Ser. No. 14/993,365 filed Jan. 12, 2016, entitled UNDER-SEAT VEHICLE COMPARTMENT HAVING A CLAMP ASSEMBLY FOR ENGAGING A TUBE SUPPORT AND FOR ABSORBING TOLERANCES AND MOVEMENT RELATED NOISE, now U.S. Pat. No. 9,802,546, the entire disclosure of which is hereby incorporated herein by reference.

FIELD OF THE INVENTION

The present invention generally relates to vehicular storage components, and more specifically, an under-seat storage drawer with a noise absorbing clamp that engages the structure of the seat.

BACKGROUND OF THE INVENTION

Various automobiles include storage areas below vehicle seats where such storage areas can include drawers, bins, and other similar containers. Such containers can be directly attached to the frame of a seat and secured thereto. Movements of the seat can, in certain situations, be transferred to the container, such that the container also experiences movement during operation of the vehicle and/or use of the corresponding vehicle seat.

SUMMARY OF THE INVENTION

According to one aspect of the present invention, a storage container for a vehicular seat includes a cushion pan for supporting a seat cushion. A lateral support bar extends between opposing side members and is positioned below the cushion pan. A container housing is disposed between the opposing side members and has a forward portion fixedly attached to an underside of the cushion pan. A rear clamp of the container housing defines a containment region. The lateral support bar is disposed within the containment region and the rear clamp defines a surface engagement with the outer surface of the lateral support bar. The rear clamp is slidably engaged with the lateral support bar, and generally vertical displacement of the container housing relative to the lateral support bar biases the lateral support bar against the rear clamp to define an absorbing state of the rear clamp. The rear clamp in the absorbing state receives at least a portion of the generally vertical displacement of the container housing relative to the lateral support bar.

According to another aspect of the present invention, an under-seat vehicular storage bin includes a seat frame having a lateral support bar, a container housing having a forward portion fixedly attached to the seat frame and a rear clamp of the container housing slidably attached to the lateral support bar, wherein the rear clamp includes a top flange and a bottom flange laterally spaced from the top flange.

According to another aspect of the present invention, a vehicular under-seat storage bin includes a seat frame having cushion and a lateral support extending between opposing sides, a housing disposed between the opposing sides and fixedly attached to the cushion and a rear clamp of the housing defining a surface engagement with the lateral support. Generally vertical displacement of the housing relative to the lateral support defines an absorbing state of the rear clamp that maintains the surface engagement.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
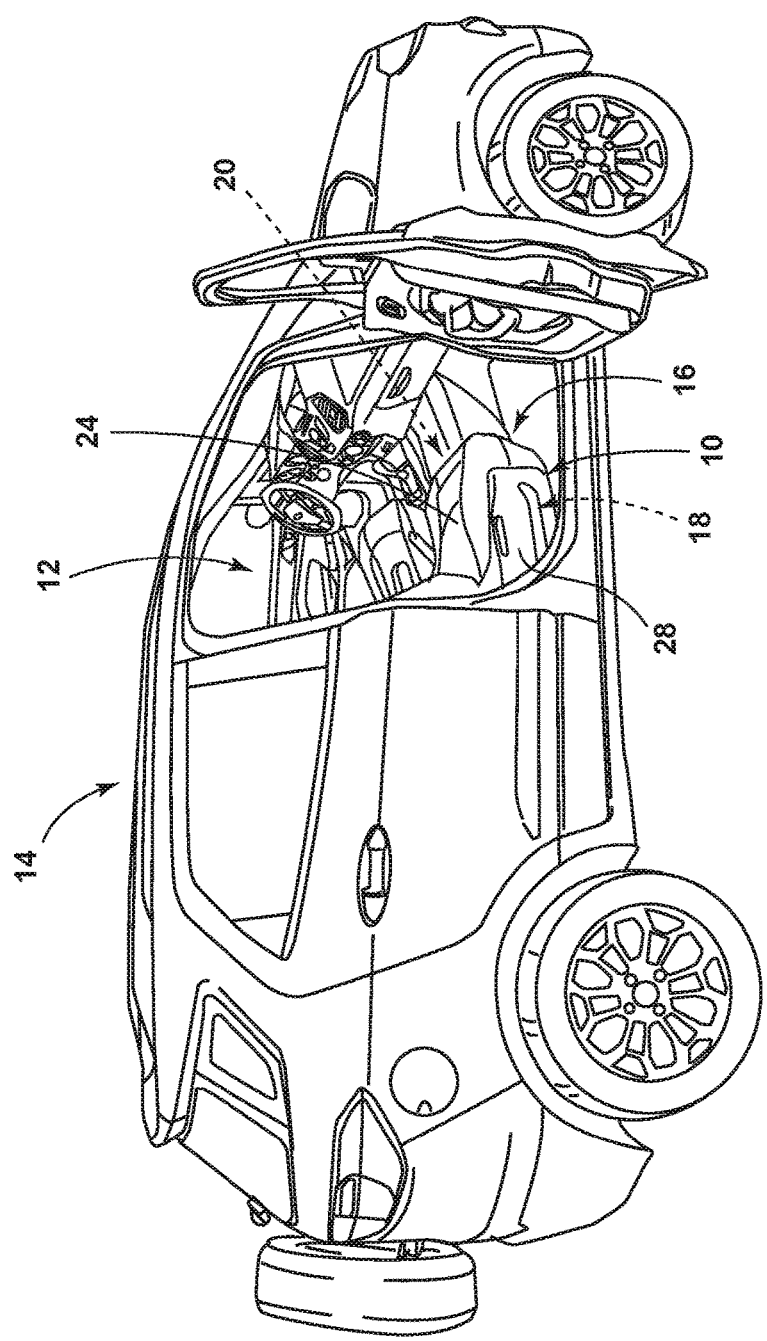
FIG. 1 is a side perspective view of a vehicle and a vehicle seat having an under-seat storage bin that incorporates an aspect of the sound absorbing clamp.
Figure 2:
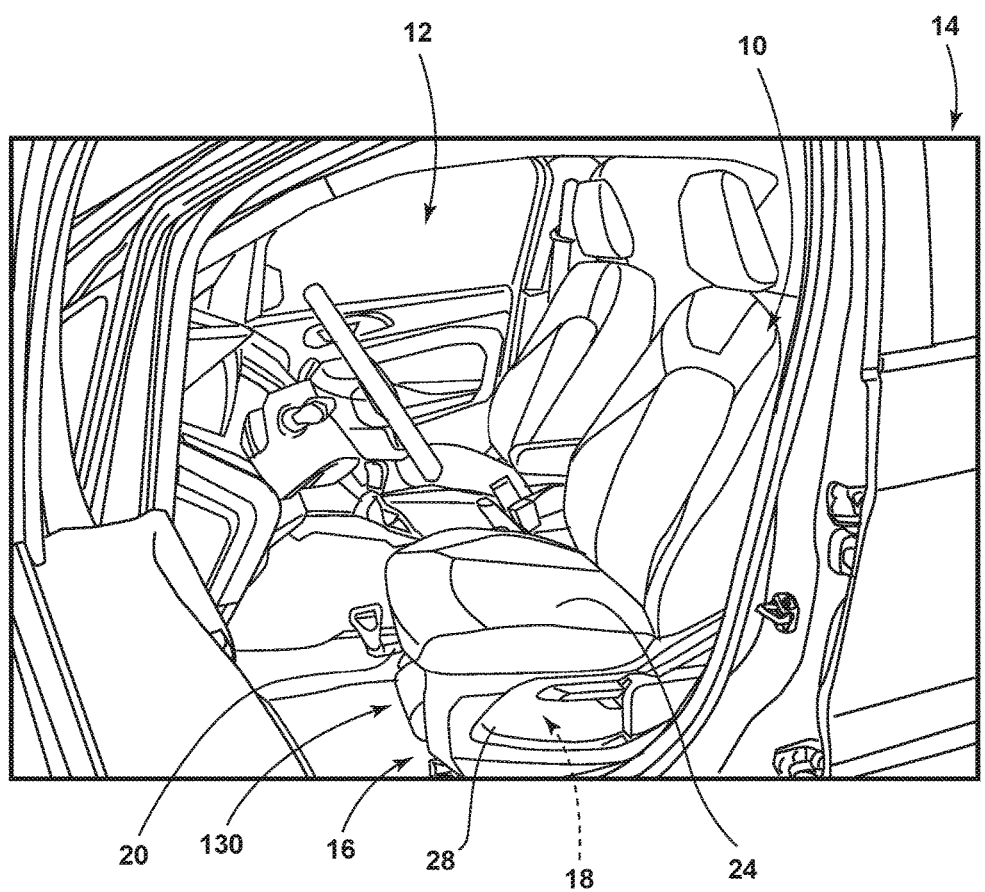
FIG. 2 is a side perspective view of a passenger cabin of the vehicle of FIG. 1.
Figure 3:
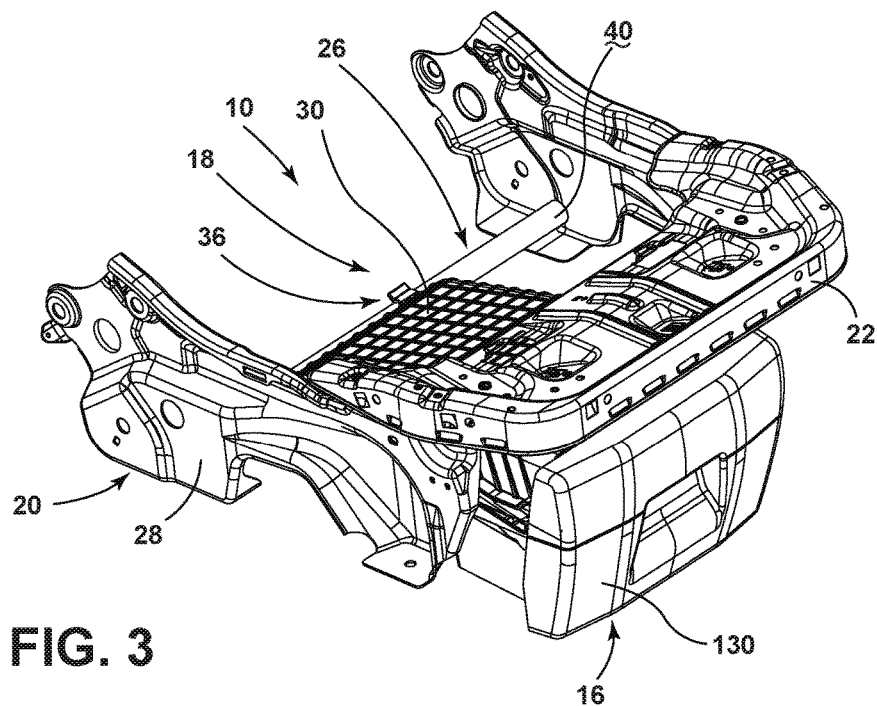
FIG. 3 is a top perspective view of various components of a seat frame incorporating an under-seat storage bin incorporating an aspect of the sound absorbing clamp.
Figure 4:
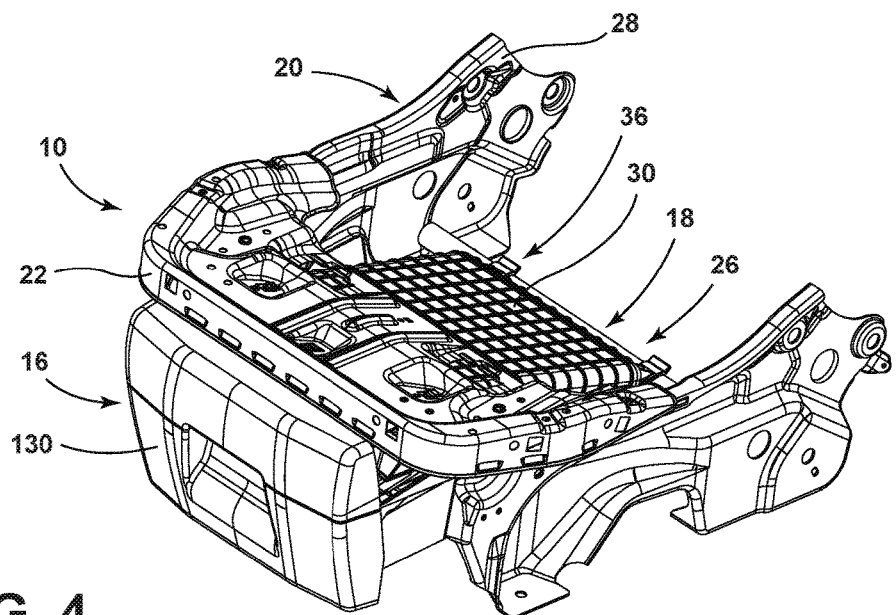
FIG. 4 is a top perspective view of the seat frame of FIG. 3.
Figure 5:
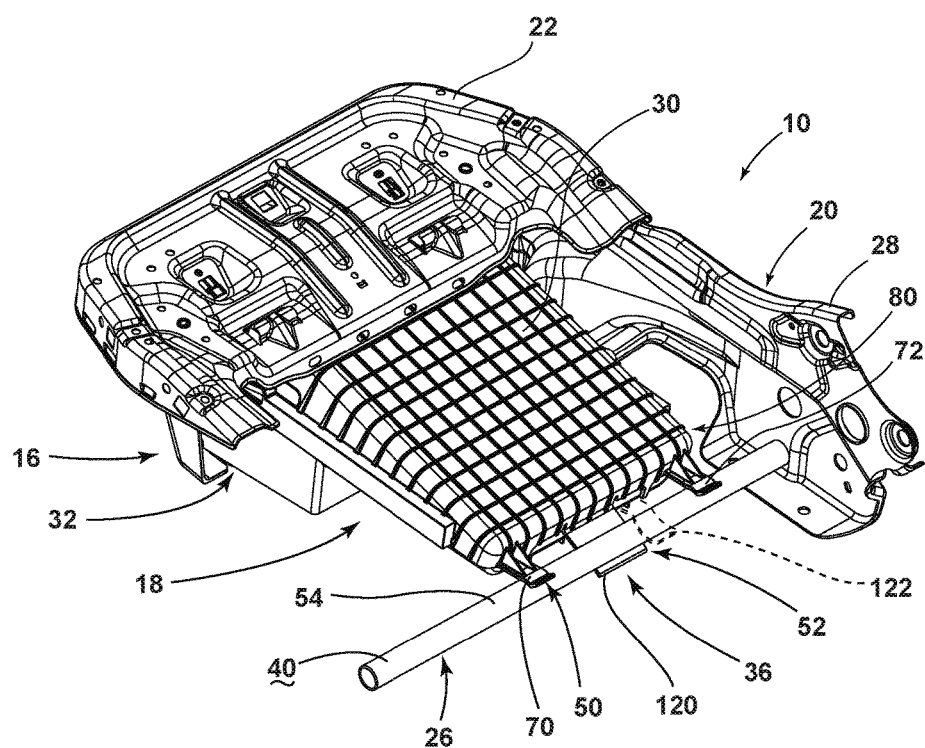
FIG. 5 is a rear perspective view of the seat frame of FIG. 3.
Figure 6:
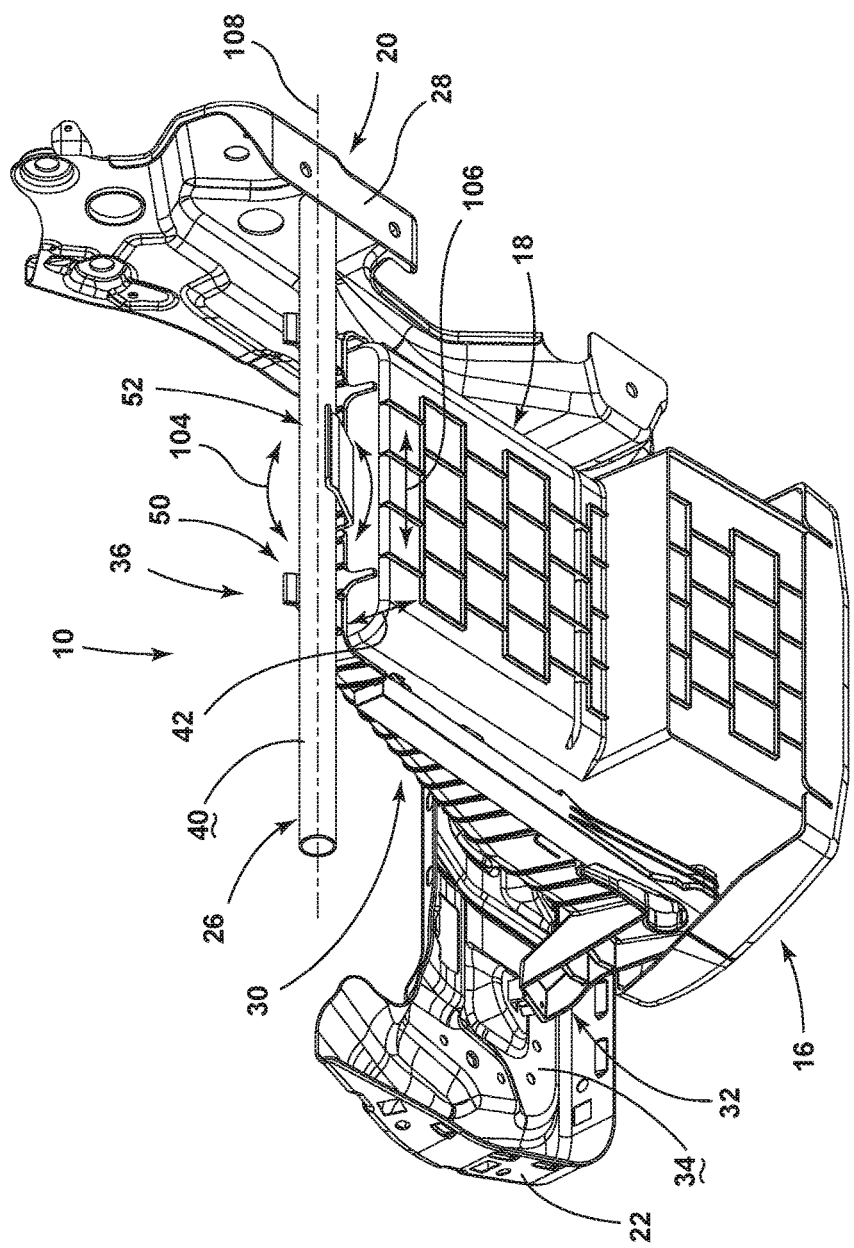
FIG. 6 is a bottom perspective view of the seat frame of FIG. 3.
Figure 7:
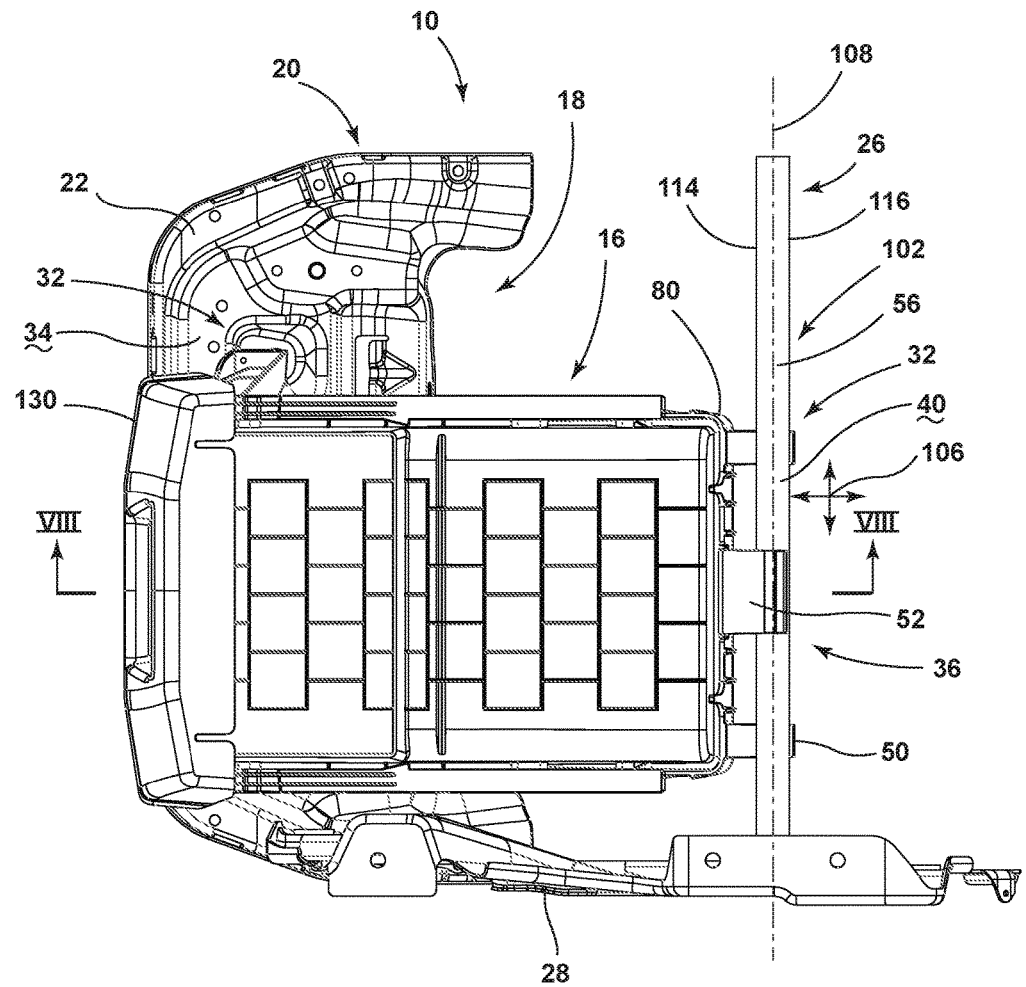
FIG. 7 is a bottom plan view of the seat frame of FIG. 3.
Figure 8:
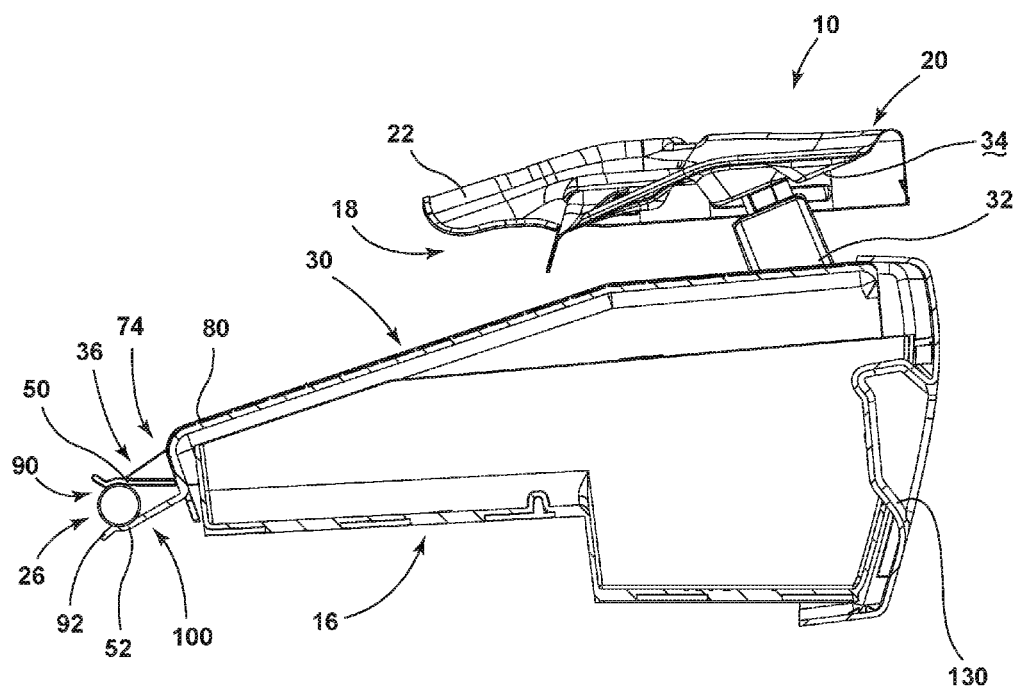
FIG. 8 is a cross-sectional view of the seat frame of FIG. 7 taken along line VIII-VIII.
Figure 9:
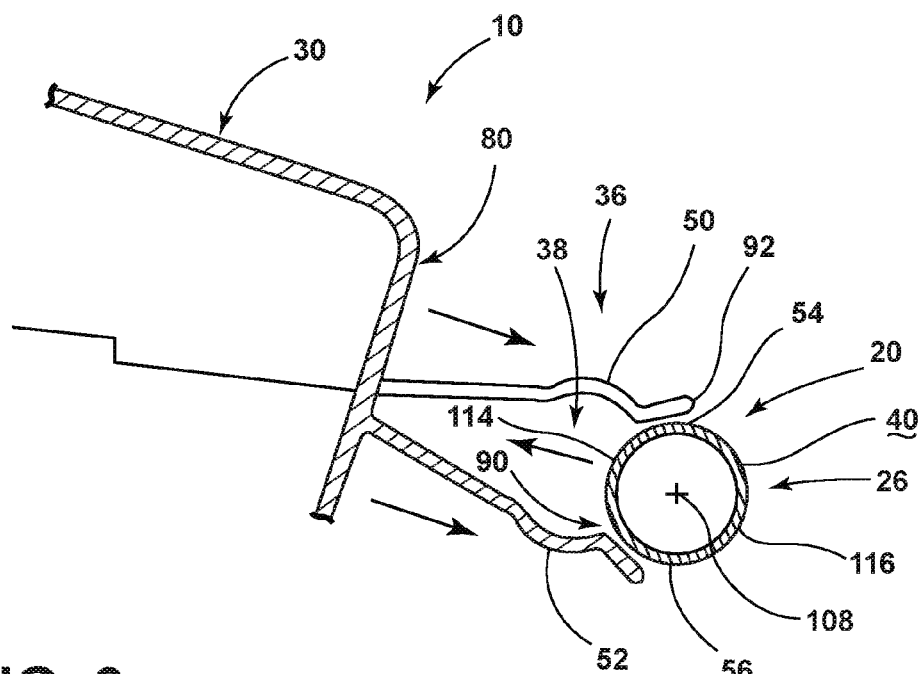
FIG. 9 is an enlarged cross-sectional view of the seat frame of FIG. 8 illustrating the sound absorbing clamp being engaged with the lateral frame member of the seat frame.
Figure 10:
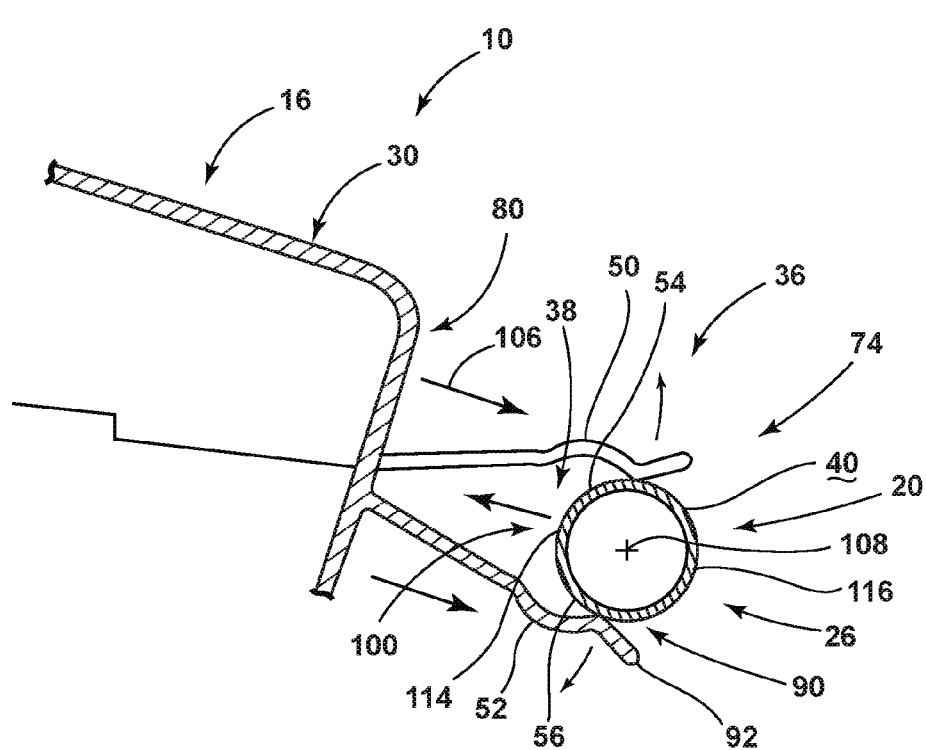
FIG. 10 is a cross-sectional view of the seat frame of FIG. 10 showing the sound absorbing clamp engaging the lateral member of the seat frame.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-8, reference numeral 10 generally refers to a vehicular seat installed within a passenger cabin 12 of a vehicle 14, where the seat 10 includes a storage container 16 disposed within a container space 18 at least partially defined by the seat frame 20 of the seat 10 of the vehicle 14. The storage container 16 for the seat 10 of the vehicle 14 can include a cushion pan 22 for supporting a cushion 24. A lateral support bar 26 extends between opposing side members 28. The lateral support bar 26 is typically positioned below the cushion pan 22. A container housing 30 is disposed between the opposing side members 28 and includes a forward portion 32 that is fixedly attached to an underside 34 of the cushion pan 22. A rear clamp 36 of the container housing 30 includes a containment region 38. It is contemplated that the lateral support bar 26 can be disposed within the containment region 38, wherein the rear clamp 36 defines a surface engagement with the outer surface 40 of the lateral support bar 26. The rear clamp 36 is slidably engaged with the lateral support bar 26. According to the various embodiments, generally vertical displacement 42 of the container housing 30 relative to the lateral support bar 26 serves to bias the lateral support bar 26 against the rear clamp 36 to define an absorbing state 44 of the rear clamp 36, wherein the rear clamp 36, when in the absorbing state 44, receives at least a portion of the generally vertical displacement 42 of the container housing 30 relative to the lateral support bar 26.

Referring to FIGS. 3-8, it is contemplated that the rear clamp 36 can include at least one top flange 50 and at least one bottom flange 52. The at least one top flange 50 slidably engages a top lateral portion 54 of the lateral support bar 26. The at least one bottom flange 52 slidably engages a bottom lateral portion 56 of the lateral support bar 26. It is also contemplated that the at least one top flange 50 and the at least one bottom flange 52 can be positioned in a vertically aligned or vertically offset configuration along the top and bottom lateral portions 54, 56 of the lateral support bar 26, respectively. In this manner, the various top flanges 50 and bottom flanges 52 of the rear clamp 36 of the container housing 30 can be positioned in a vertically aligned configuration or in an alternating configuration that alternates in engagement with the top and bottom lateral portions 54, 56 of the lateral support bar 26.

Referring again to FIGS. 3-8, according to the various embodiments, it is contemplated that at least one top flange 50 can include first and second top flanges 70, 72 and wherein the at least one bottom flange 52 can include a single bottom flange 52. According to the various embodiments of the device, the rear clamp 36 can include various numbers of top flanges 50 and bottom flanges 52 that can be used to at least partially surround the outer surface 40 of the lateral support bar 26. Each of the top and bottom flanges 50, 52 at least partially defines the containment region 38 that receives the lateral support bar 26 and provides structure for creating the surface engagement between the rear clamp 36 and the lateral support bar 26. Based upon this configuration, it is contemplated that the rear clamp 36, when in the absorbing state 44, defines a range of flexibility 74 of the rear clamp 36. The range of flexibility 74 defines a range within which the rear clamp 36 operates to receive at least a portion of the generally vertical displacement 42 of the container housing 30 relative to the lateral support bar 26. In this manner, during operation of the vehicle 14 and/or when an occupant of the vehicle 14 sits in the seat 10 above the storage container 16, movement of the seat 10 can be transferred through the seat 10 and into the storage container 16, such that the container housing 30 moves relative to the seat frame 20. In particular, a rear portion 80 of the container housing 30 can receive movement through the weight of an occupant or through movement and/or vibrations of a vehicle 14 during operation. These movements of the container housing 30 can be transferred through a rear portion 80 of the storage container 16 and into the rear clamp 36 which is slidably attached to the lateral support bar 26. Accordingly, the container housing 30 moves with respect to the lateral support bar 26 while the rear clamp 36 maintains the engagement between the container housing 30 and the lateral support bar 26. The generally vertical displacement 42 of the container housing 30 that may be caused by the weight of an occupant sitting in the seat 10 can be absorbed through the surface engagement of the rear clamp 36 with the lateral support bar 26, as will be described more fully below.

Referring now to FIGS. 3-12, the lateral support bar 26 can be a generally tubular member that extends between the opposing side members 28 of the seat frame 20. Typically, the lateral support bar 26 will be a generally cylindrical member that extends between the opposing side members 28. When the rear clamp 36 is disposed under the seat 10 such that the rear clamp 36 is placed in engagement with the lateral support bar 26, the top and bottom flanges 50, 52 can be biased outward as the rear clamp 36 engages the lateral support bar 26 to allow the rear clamp 36 to extend outward and around the lateral support bar 26 such that the lateral support bar 26 can enter through a clamp opening 90 of the rear clamp 36 and be contained through a surface engagement within the containment region 38 of the rear clamp 36. As the lateral support bar 26 is disposed in a containment region 38, the top and bottom flanges 50, 52 are biased toward one another such that the top and bottom flanges 50, 52 of the rear clamp 36 at least partially surround the lateral support bar 26 to contain the lateral support bar 26 in the containment region 38 of the rear clamp 36. To assist the placement of the lateral support bar 26 within the containment region 38, one or both of the top and bottom flanges 50, 52 can include receiving flanges 92 that extend generally away from one another. The receiving flange 92 of the top flange 50 extends in a generally upward direction and the receiving flange 92 of the bottom flange 52 extends in a generally downward direction to define the clamp opening 90. In this manner, as the receiving flanges 92 engage the outer surface 40 of the lateral support bar 26, the receiving flanges 92 are biased outward through a sliding engagement of the receiving flanges 92 with the outer surface 40 of the lateral support bar 26 and bias the top and bottom flanges 50, 52 outward such that the lateral support bar 26 can enter through the clamp opening 90 and into the containment region 38 of the rear clamp 36. Once the lateral support bar 26 is in the containment region 38, the top and bottom flanges 50, 52 of the rear clamp 36 are biased toward an original position and generally toward one another through the general configuration of the top and bottom flanges 50, 52. The top and bottom flanges 50, 52 engage the top and bottom lateral portions 54, 56 of the lateral support bar 26, respectively.

Referring again to FIGS. 3-12, the storage container 16 for the seat 10 of vehicle 14, such as an under-seat vehicular storage bin, can include a seat frame 20 having a lateral support bar 26 and a container housing 30 having a forward portion 32 that is fixedly attached to the seat frame 20. The forward portion 32 of the container housing 30 is typically attached to the underside 34 of the cushion pan 22 of the seat frame 20. A rear clamp 36 of the container housing 30 is slidably attached to the lateral support bar 26, such that the rear clamp 36 includes a top flange 50 and a bottom flange 52 that are laterally spaced from one another and, typically, not in a vertical alignment with one another. According to the various embodiments, the top and bottom flanges 50, 52 of the rear clamp 36 can include a displacement absorbing region 100 within which the lateral support bar 26 is slidably engaged by the top and bottom flanges 50, 52. The displacement absorbing region 100 defines a static state 102, wherein the container housing 30 is free of displacement relative to the lateral support bar 26. In the static state 102, the container housing 30 is substantially free of vertical and/or lateral displacement 42, 106 while attached to the lateral support bar 26. The displacement absorbing region 100 also defines the absorbing state 44, wherein the container housing 30 is displaced relative to the lateral support bar 26. The displacement of the container housing 30 relative to the lateral support bar 26 can be any one or more of rotational displacement 104, lateral displacement 106 or vertical displacement 42. In the event of lateral displacement 106, the slidable engagement between the rear clamp 36 and the lateral support bar 26 allows the container housing 30 to slide horizontally such that the rear clamp 36 slides along the outer surface 40 of the lateral support bar 26, typically along a longitudinal axis 108 of the lateral support bar 26. Because of the surface engagement between the rear clamp 36 and the lateral support bar 26, there are no fixing members that project into the lateral support bar 26 to fix the lateral position of the rear clamp 36 with respect to the lateral support bar 26.

Figure 11:
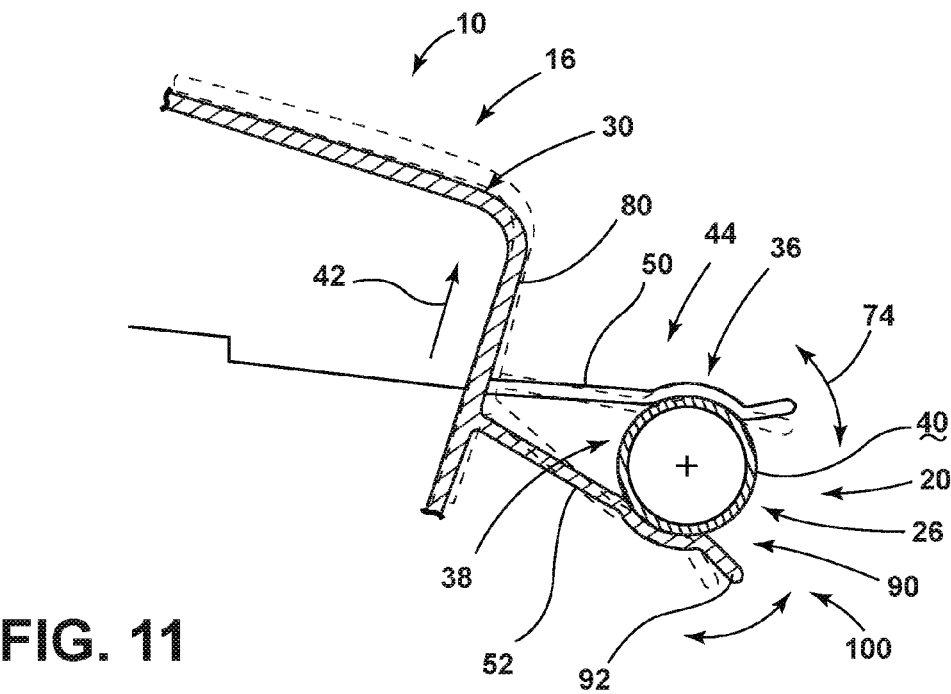
FIG. 11 is a cross-sectional view of an aspect of the sound absorbing clamp illustrating a downward tolerance absorbing movement of the sound absorbing clamp relative to the lateral frame member.
Figure 12:
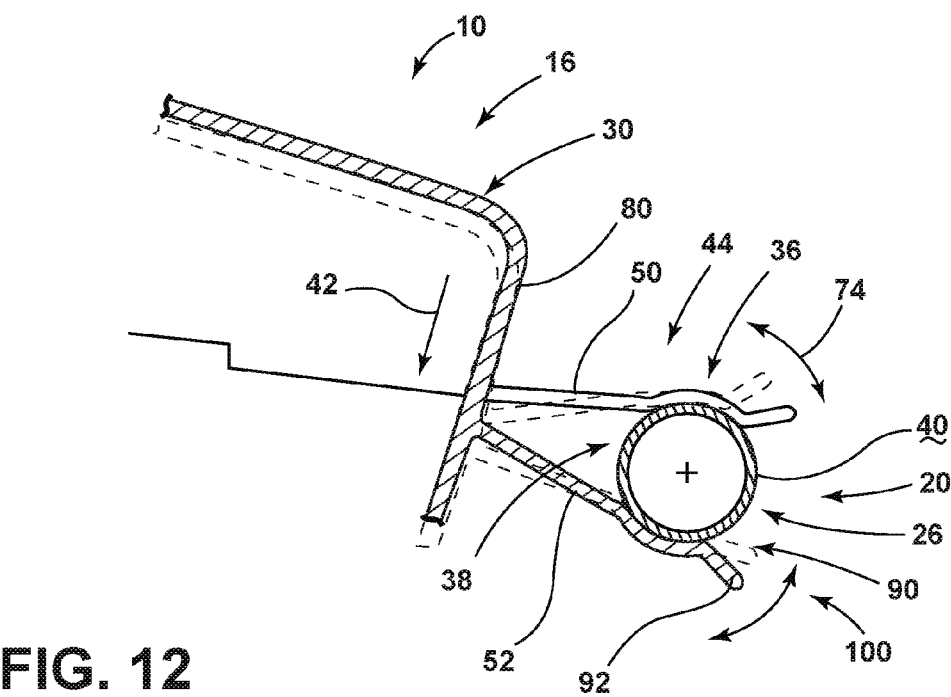
FIG. 12 is a cross-sectional view of an aspect of the sound absorbing clamp illustrating an upward tolerance absorbing movement of the sound absorbing clamp relative to the lateral frame member.

With regard to vertical displacement 42, the displacement absorbing region 100, as exemplified in FIGS. 11 and 12, allows for deflection of the various top and bottom flanges 50, 52 of the rear clamp 36 such that vertical displacement 42 of the container housing 30 can be absorbed as the deflection of the top and bottom flanges 50, 52 allows for the generally vertical movement of the container housing 30 with respect to the lateral support bar 26 and the seat 10 of vehicle 14 in general. It is contemplated that the fixed connection between the forward portion 32 of the container housing 30 with the seat frame 20, such as the cushion pan 22, can include a generally flexible connection that allows for the vertical and lateral movement of the rear portion 80 of the container housing 30, such that the rear clamp 36 can move within the displacement absorbing region 100 of the top and bottom flanges 50, 52.

According to the various embodiments, through this displacement absorbing region 100 that allows for vertical and/or lateral displacement 42, 106 of the rear clamp 36 with respect to the lateral support bar 26, various tolerances are provided for in the manufacture of the vehicle 14, such that exact dimensioning of the seat frame 20 with respect to the container housing 30 may not be necessary and variations in the dimensional tolerances of the seat frame 20 can be accounted for through the inclusion of the displacement absorbing region 100 within the top and bottom flanges 50, 52 of the rear clamp 36. Additionally, the displacement absorbing region 100 of the top and bottom flanges 50, 52 of the rear clamp 36 also provide for movement of the container housing 30 with respect to the seat frame 20 such that various squeaks, creaks, and other movement-related noises that can occur during operation of the vehicle 14 and use of the seat 10 can be minimized through the surface connection between the rear clamp 36 and the outer surface 40 of the lateral support bar 26. Because the top and bottom flanges 50, 52 are allowed to slide along the outer surface 40 of the lateral support bar 26 and also deflect around the outer surface 40 of the lateral support bar 26, these various movement-related noises can be absorbed or substantially absorbed. In this manner, these movement-related noises can be minimized by providing a system that allows for limited slidable movement between the container housing 30 and the lateral support bar 26.

Referring again to FIGS. 3-12, it is contemplated that the lateral support bar 26 can include an arcuate cross section, such as a circle, oval, irregular arcuate cross section, or other similar arcuate cross section. Other cross sections can include, but are not limited to, rectangular, triangular, polygonal, irregular, or other similar shape. Regardless of the cross-sectional shape of the lateral support bar 26, the lateral support bar 26 is configured to engage the containment region 38 of the rear clamp 36 to allow the displacement absorbing region 100 of the top and bottom flanges 50, 52 of the rear clamp 36 to absorb movement of the container housing 30 with respect to the lateral support bar 26. Accordingly, various movements of the top and bottom flanges 50, 52 relative to the lateral support bar 26 are configured to be absorbed through the sliding movement of the top and bottom flanges 50, 52 with respect to the outer surface 40 of the lateral support bar 26. As discussed above, these sliding movements can be a lateral displacement 106, vertical displacement 42, rotational displacement 104, combinations thereof, and other similar directional movements of the container housing 30 with respect to the lateral support bar 26 and the seat frame 20 in general.

According to the various embodiments, in order to allow for various movements of the rear clamp 36 with respect to the lateral support bar 26, the top and bottom flanges 50, 52 and the container housing 30 are typically free of engagement with front and rear lateral portions 114, 116 of the lateral support bar 26. As discussed above, the primary engagement between the rear clamp 36 and the lateral support bar 26 is with the top and bottom lateral portions 54, 56 of the outer surface 40 of the lateral support bar 26. It is contemplated that in various embodiments of the device, at least one or both of the top and bottom flanges 50, 52 can at least partially engage the front and rear lateral portions 114, 116 of the lateral support bar 26. Such engagement can be experienced during displacement of the top and bottom flanges 50, 52 during the general vertical displacement 42 of the container housing 30 with respect to the lateral support bar 26. Movement of the top and bottom flanges 50, 52 in the absorbing state 44 through portions of the displacement of the absorbing region can cause portions of the top and bottom flanges 50, 52 to at least partially engage the outer surface 40 of the lateral support bar 26 within the front and rear lateral portions 114, 116 of the lateral support bar 26.

According to the various embodiments, as exemplified in FIGS. 3-12, the top and bottom flanges 50, 52 can include various numbers of top and bottom flanges 50, 52, respectively. Accordingly, the various top flanges 50 can include first and second top flanges 70, 72 that are spaced apart from one another, and the bottom flanges 52 can include a single bottom flange 52 or can include first and second bottom flanges 120, 122 that are also spaced apart from one another. It is contemplated that the top and bottom flanges 50, 52 can be in vertical alignment, or can be alternatively spaced such that the top and bottom flanges 50, 52 are out of vertical alignment with one another. This lack of vertical alignment can cause the top flange 50 to be positioned between the first and second bottom flanges 120, 122. Alternatively, a single bottom flange 52 can be disposed between the first and second top flanges 70, 72.

Referring again to FIGS. 1-12, the vehicular under-seat storage bin, that includes the storage container 16 attached to the seat frame 20 of the seat 10, can include the seat frame 20 having a cushion 24 and a lateral support such as the lateral support bar 26 extending between the opposing side members 28. A housing, such as the container housing 30, can be disposed between the opposing sides and fixedly attached to the cushion 24. It is contemplated that the cushion 24 can include a cushion pan 22 that supports the cushion 24 from below. According to the various embodiments, the housing can be attached to either the cushion 24, a structural portion thereof, or a separate cushion pan 22 that is attached to the cushion 24. The rear clamp 36 of the housing defines a surface engagement with the lateral support bar 26, wherein generally vertical displacement 42 of the housing relative to the lateral support bar 26 defines an absorbing state 44 of the rear clamp 36 that maintains the surface engagement between the rear clamp 36 and the lateral support bar 26.

According to the various embodiments, as exemplified in FIGS. 1-12, the rear clamp 36 defines a displacement absorbing region 100 that at least partially contains the lateral support bar 26. This displacement absorbing region 100 defines the static state 102, wherein the container housing 30 is free of displacement relative to the lateral support bar 26. The displacement absorbing region 100 also defines the absorbing state 44, wherein the container housing 30 is displaced relative to the lateral support bar 26. The absorbing state 44 of the displacement absorbing region 100 is further defined by at least a portion of the rear clamp 36 being vertically biased by the lateral support bar 26 to receive at least a portion of the lateral displacement 106, vertical displacement 42 and/or rotational displacement 104 of the container housing 30. It is contemplated that the rear clamp 36 can include at least one flange, such as a top flange 50, and/or a bottom flange 52, wherein the at least one flange engages top and bottom lateral portions 54, 56 of the lateral support bar 26.

According to the various embodiments, it is contemplated that the rear clamp 36 can include a single flange that extends around a portion of the lateral support bar 26, wherein the single flange engages both the top and bottom lateral portions 54, 56 of the lateral support bar 26. The single flange of the rear clamp 36 can also, in various embodiments, engage a front and/or rear lateral portion 114, 116 of the lateral support bar 26 as well. It is also contemplated that the single flange can be free of engagement with the front and rear lateral portions 114, 116 of the lateral support bar 26.

Referring again to FIGS. 3-12, the various lateral movements of the container housing 30 can include side-to-side displacement as well as forward and rearward displacement and can also be absorbed by the rear clamp 36. This forward and rearward displacement can be absorbed by embodiments of the rear clamp 36 having separate top and bottom flanges 50, 52 or a single flange. Again, the outward displacement of the top and bottom flanges 50, 52, as generally exemplified in FIGS. 10 and 11, can serve to allow for sideways, forward and rearward lateral displacement 106 of the container housing 30 with respect to the lateral support bar 26, and also contain the lateral support bar 26 within the containment region 38 defined by the top and bottom flanges 50, 52 of the rear clamp 36.

According to the various embodiments, the container housing 30 can include various operable containers that can include, but are not limited to, drawers 130, doors, slidable bins, rotating bins, trays, hooks, and other similar containment systems. These containment systems are configured to be attached to the rear clamp 36, such that the rear clamp 36 can engage the lateral support bar 26 to define the various positions of the rear clamp 36 within the displacement absorbing region 100 defined by the top and bottom flanges 50, 52. As discussed above, the movement of the top and bottom flanges 50, 52 within the displacement absorbing region 100 serves to absorb various creaks, squeaks, and other movement-related noises that may otherwise be experienced between the container housing 30 and the seat frame 20.

According to the various embodiments, it is contemplated that the container housing 30 can include a forward clamp that has a configuration similar to the rear clamp 36 that engages a portion of the seat frame 20 at the forward portion 32 of the container housing 30. In such an embodiment, it is contemplated that both the forward and rearward portions of the container housing 30, or forward or rear portions 32, 80 of the container housing 30 can include the clamp that defines the displacement absorbing region 100 of the container housing 30 for absorbing various tolerances and movement-related noises of the container housing 30 with respect to the seat frame 20 of the seat 10 of vehicle 14.

It is contemplated that the rear clamp 36 of the container housing 30 can be made of various materials that can include, but are not limited to, plastic, various polymers, metals, combinations thereof, and other similar rigid but displaceable materials that can move within the displacement absorbing region 100 defined by the top and bottom flanges 50, 52 of the rear clamp 36. Typically, plastic or other similar polymer-type material will be used for the rear clamp 36 to allow for the slidable engagement between the rear clamp 36 and the lateral support bar 26. In such an embodiment, the sliding engagement between the rear clamp 36 and the lateral support bar 26 would produce minimal noise as a result of this sliding engagement.

According to the various embodiments, the clamps that define the displacement of the absorbing region can also be disposed proximate the opposing side members 28 of the seat frame 20. In such an embodiment, sides of the container housing 30 can include the rear clamps 36 that engage support members defined within each of the opposing side members 28 of the seat frame 20. It is contemplated that these rear clamps 36 could each define the displacement absorbing region 100 to allow for various movements of the container housing 30 with respect to the seat frame 20. Where the rear clamps 36 are disposed proximate the opposing side members 28 of the seat frame 20, various rotational movements of the container housing 30, as well as vertical, lateral, and rotational movements can be absorbed through the operation of the one or more rear clamps 36 through the displacement absorbing region 100 defined by the various top and bottom flanges 50, 52.

Through the inclusion of the container housing 30 having the rear clamp 36 that engages the lateral support bar 26, manufacturing of the seat 10 of vehicle 14 and the storage container 16 disposed under the seat 10 can be a more efficient process. Various conventional assemblies for absorbing tolerances and movement-related noises can be eliminated such as various added fasteners, sliding assemblies, rocking assemblies, flexible tolerance absorbing mechanisms, and other similar assemblies can be eliminated through the inclusion of the single rear clamp 36 having the various top and bottom flanges 50, 52 to define the displacement absorbing region 100.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
a cushion pan for supporting a seat cushion;
a lateral support bar positioned below the cushion pan;
a container housing fixed to the cushion pan; and
a rear clamp slidably engaged with the lateral support bar, wherein generally vertical displacement of the container housing relative to the lateral support bar biases the lateral support bar against the rear clamp to define an absorbing state of the rear clamp.

2. The vehicle of claim 1, wherein the rear clamp includes at least one top flange and at least one bottom flange, wherein the at least one top flange slidably engages a top lateral portion of the lateral support bar, and wherein the at least one bottom flange slidably engages a bottom lateral portion of the lateral support bar.

3. The vehicle of claim 2, wherein the at least one top flange and the at least one bottom flange are positioned in a vertically offset configuration along the top and bottom lateral portions, respectively.

4. The vehicle of claim 2, wherein the at least one top flange includes first and second top flanges, and wherein the at least one bottom flange includes a single bottom flange.

5. The vehicle of claim 1, wherein the rear clamp in the absorbing state defines a range of flexibility, wherein the range of flexibility defines a range within which the rear clamp operates to receive at least a portion of the generally vertical displacement of the container housing relative to the lateral support bar.

6. The vehicle of claim 1, wherein the lateral support bar is a generally tubular member.

7. The vehicle of claim 1, wherein the lateral support bar is a generally cylindrical member.

8. An under-seat vehicular storage bin comprising:
a seat frame having a lateral support bar;
a housing fixedly attached to the seat frame; and
a clamp of the housing slidably attached to the lateral support bar, wherein the clamp includes a top flange and a bottom flange laterally spaced from the top flange.

9. The under-seat vehicular storage bin of claim 8, wherein the top and bottom flanges define a displacement absorbing region within which the lateral support bar is slidably engaged by the top and bottom flanges.

10. The under-seat vehicular storage bin of claim 9, wherein the displacement absorbing region defines a static state, wherein the housing is free of displacement relative to the lateral support bar, and an absorbing state, wherein the housing is displaced relative to the lateral support bar, wherein the absorbing state is further defined by at least one of the top and bottom flanges being vertically biased by the lateral support bar to receive at least a portion of the displacement of the housing.

11. The under-seat vehicular storage bin of claim 10, wherein the lateral support bar includes an arcuate cross section.

12. The under-seat vehicular storage bin of claim 8, wherein the top and bottom flanges and the housing are free of engagement with front and rear lateral portions of the lateral support bar.

13. The under-seat vehicular storage bin of claim 10, wherein the bottom flange includes a first bottom flange and a second bottom flange, wherein the first bottom flange is spaced apart from the second bottom flange.

14. The under-seat vehicular storage bin of claim 13, wherein the top flange is positioned between the first and second bottom flanges.

15. The under-seat vehicular storage bin of claim 10, wherein the top flange includes first and second top flanges, wherein the first top flange is spaced apart from the second top flange, and wherein the bottom flange is positioned between the first and second top flanges.

16. The under-seat vehicular storage bin of claim 10, wherein the top and bottom flanges in the absorbing state define a range of flexibility, wherein the range of flexibility defines a range within which the housing moves relative to the lateral support bar.

17. A vehicular under-seat storage bin comprising:
a seat frame having a lateral support extending between opposing side members;
a housing disposed between the opposing side members and fixedly attached to a cushion pan of the seat frame; and
a clamp of the housing engaged with the lateral support, wherein generally vertical displacement of the housing relative to the lateral support defines an absorbing state of the clamp that maintains sliding engagement with the lateral support.

18. The vehicular under-seat storage bin of claim 17, wherein the clamp defines a displacement absorbing region that at least partially contains the lateral support, wherein the displacement absorbing region defines a static state, wherein the housing is free of displacement relative to the lateral support, and the absorbing state, wherein the housing is displaced relative to the lateral support, wherein the absorbing state is further defined by at least a portion of the clamp being vertically biased by the lateral support to receive at least a portion of the displacement of the housing.

19. The vehicular under-seat storage bin of claim 18, wherein the clamp includes at least one flange, wherein the at least one flange engages top and bottom lateral portions of the lateral support.

20. The vehicular under-seat storage bin of claim 19, wherein the clamp is free of engagement with front and rear lateral portions of the lateral support.

* * * * *